(12) United States Patent
Clarke et al.

(10) Patent No.: US 7,763,336 B2
(45) Date of Patent: Jul. 27, 2010

(54) FLEXIBLE COUPLING SLEEVE AND A FLEXIBLE SHAFT COUPLING INCORPORATING SAME

(75) Inventors: Arthur Jack Clarke, Dumfries and Galloway (GB); Richard Bell, Denver, CO (US); Joseph R. Duke, Jr., Elizabethtown, KY (US); William W. L. Wu, Elizabethtown, KY (US)

(73) Assignee: The Gates Corporation, Denver, CO (US)

( * ) Notice: Subject to any disclaimer, the term of this patent is extended or adjusted under 35 U.S.C. 154(b) by 200 days.

(21) Appl. No.: 10/849,716

(22) Filed: May 20, 2004

(65) Prior Publication Data

US 2005/0260375 A1 Nov. 24, 2005

(51) Int. Cl.
| | |
|---|---|
| *B29C 47/00* | (2006.01) |
| *F16L 11/04* | (2006.01) |
| *B29D 22/00* | (2006.01) |
| *B28B 23/00* | (2006.01) |
| *B65D 39/00* | (2006.01) |
| *F16D 3/04* | (2006.01) |
| *F16D 3/00* | (2006.01) |

(52) U.S. Cl. .................. 428/36.9; 428/36.91; 428/35.7; 428/36.4; 428/36.8; 464/104; 464/73; 464/903

(58) Field of Classification Search ................ 428/36.9, 428/36.91, 35.7, 36.4, 36.8; 464/104, 73, 464/903
See application file for complete search history.

(56) References Cited

U.S. PATENT DOCUMENTS

| 2,740,271 | A | * | 4/1956 | Beler ............................. 464/88 |
|---|---|---|---|---|
| 2,918,809 | A | | 2/1959 | Miller ............................ 64/9 |
| 3,313,124 | A | | 4/1967 | Filepp ............................ 64/9 |
| 5,231,159 | A | | 7/1993 | Patterson et al. ............... 528/53 |
| 5,703,193 | A | | 12/1997 | Rosenberg et al. ............. 528/44 |
| 6,046,297 | A | | 4/2000 | Rosenberg et al. ............. 528/63 |
| 6,174,984 | B1 | | 1/2001 | Peter ............................ 528/64 |
| 6,283,868 | B1 | * | 9/2001 | Clarke et al. ................... 464/88 |
| 6,964,626 | B1 | * | 11/2005 | Wu et al. ....................... 474/260 |
| 2003/0065124 | A1 | | 4/2003 | Rosenberg et al. ............. 528/59 |

FOREIGN PATENT DOCUMENTS

| EP | 0 971 142 A | 12/2000 |
|---|---|---|
| GB | 879493 | 10/1959 |
| WO | WO96/02584 A1 | 2/1996 |

* cited by examiner

*Primary Examiner*—Victor S Chang
(74) *Attorney, Agent, or Firm*—P. N. Dunlap, Esq.; J. A. Thurnau, Esq.; J. L. Mahurin, Esq.

(57) ABSTRACT

A flexible shaft coupling sleeve comprising a sleeve shaped body having a central annular portion and a coupling receiving portion at each of two opposing sleeve ends, and a coupling device incorporating such sleeve. The sleeve's coupling receiving portions include axially extending teeth on their inner surfaces. The flexible shaft coupling sleeve is formed of a polyurethane elastomer composition.

59 Claims, 3 Drawing Sheets

FLEXIBLE COUPLING SLEEVE AND A FLEXIBLE SHAFT COUPLING INCORPORATING SAME

BACKGROUND OF THE INVENTION

1. Field of the Invention

The present invention relates to a flexible coupling sleeve for a flexible shaft coupling of the sleeve type, and to a flexible shaft coupling device incorporating such sleeve.

2. Description of the Related Art

Flexible coupling sleeves for use as part of a flexible shaft coupling of the sleeve-type generally comprise a central annular- or generally cylindrical portion and a coupling receiving portion at either end of the cylindrical portion. Each of the coupling receiving portions includes a plurality of axially extending ribs or teeth along at least a portion of the inner periphery of the sleeve for meshing with grooves in oppositely disposed hubs or end pieces to form a flexible coupling. Such couplings are used to connect two rotating shafts that are coupled to the end pieces. Sleeve-type flexible shaft couplings are useful for accommodating misalignment of two shafts to be coupled together, and for providing a low noise driving connection between the shafts by virtue of their flexible cylindrical portion and the resiliency of their teeth. A coupled assembly such as a transmission comprises a spline-like driving shaft, a similar driven shaft, and a coupling operatively connecting the shafts generally along the axes thereof and in driving relation so as to transmit power therebetween. Various illustrations of sleeve-type flexible couplings and coupling sleeves for utilization in same are set forth for example in Great Britain Patent No. 879,493, in U.S. Pat. No. 2,918,809 to Miller, and in U.S. Pat. No. 6,283,868 to Clarke et al.

In sleeve-type flexible shaft couplings wherein rotation of a driver shaft in relation to a driven shaft is caused by the transmission of torque across the length of the sleeve-shaped body, which results in twisting of the coupling's central cylindrical portion, it is necessary to counter the radial force to which the coupling sleeve is exposed in use to prevent it from expanding and becoming inoperative, particularly in high- and/or variable speed applications in which early coupling failure is common. Methods that have been employed for this purpose include reinforcing the central cylindrical portion of such coupling sleeves formed of a vulcanized synthetic rubber with a highly resilient tensile cord; or forming the teeth of the sleeve so that they mechanically interlock with the corresponding grooves in the hubs or end-pieces and are thus prevented from expanding away from the grooves. It is moreover necessary to form the coupling device so that it possesses sufficient circumferential shear stress resistance for its intended application to prevent the weakest point of the coupling, i.e., it's teeth, from failing prematurely. Methods that have been employed for this purpose include covering the vulcanized synthetic rubber tooth portions of the coupling sleeve to include an outer, end-piece engaging wear-resistant textile jacket to improve the overall resilience of the sleeve's teeth.

Power transmission belts formed of a polyurethane/urea composition exhibiting improved thermal stability are known from International Patent Application Publication No. WO96/02584 to Wu et al. The teachings of WO96/02584 with respect to those applications to which the disclosed polyurethane/urea compositions find use are limited to power transmission belts, e.g., timing belts, multi-v-ribbed belts and V-belts, which are composite articles comprising both a textile reinforcement member, e.g., a tensile cord, and the polyurethane/urea flexible portion. Moreover, such belt applications call for a flexible member exhibiting a certain set of performance properties, e.g., high flex fatigue resistance and high power transmitting capability under high strain conditions. The use to which a flexible sleeve-type coupling is put conversely calls for a generally different set of performance properties, e.g., torque transmission capability under high and/or variable stress conditions, characterized by high and/or variable amplitudes and frequencies.

Moreover, innovations in automotive technology that have come about in recent years, including for example in accessory drive applications, in part as a consequence of the prominence of increasingly small engine compartments, provides increasing opportunity for the utilization of couplings in direct drive configurations. But such applications are characterized by extremely high speeds, e.g., 18,000-20,000 rpms or even higher, frequent speed changes, high accelerations and broad operating temperature requirements, e.g., −40 to 140° C. At these extremes of temperature, acceleration and speed, a highly durable, reliable and temperature-stable flexible coupling is needed.

Such a durable, reliable and, optionally, temperature-stable coupling sleeve and flexible sleeve-type coupling incorporating such sleeve that would moreover be economical to produce would be highly desirable.

SUMMARY OF THE INVENTION

The present invention provides a coupling sleeve for use in a sleeve-type flexible shaft coupling device, comprising a generally cylindrical body portion having an inner periphery and an outer periphery; and a length extending from a first- to a second of two opposing sleeve end portions defining respective coupling receiving portions; the coupling receiving portions each comprising a plurality of circumferentially spaced axially extending teeth arranged along at least a portion of said inner periphery, wherein at least one of the cylindrical body portion and the coupling receiving portions comprises a polyurethane- or polyurethane/urea elastomer composition.

In a further embodiment, a sleeve-type flexible coupling assembly is provided, comprising a coupling sleeve as described above, and moreover comprising at least one end piece having grooves complementary to the teeth of the flexible coupling sleeve coupling receiving portion for meshing therewith, each such end piece being for engagement in a coupling receiving portion for further engagement to one of a driver- and a driven shaft.

BRIEF DESCRIPTION OF THE DRAWINGS

The accompanying drawings, which are incorporated in and form a part of the specification, illustrate various embodiments of the invention, and together with a description, serve to explain principles of the invention. In the several drawings, like numerals designate like parts, and.

DETAILED DESCRIPTION

Figure 1:
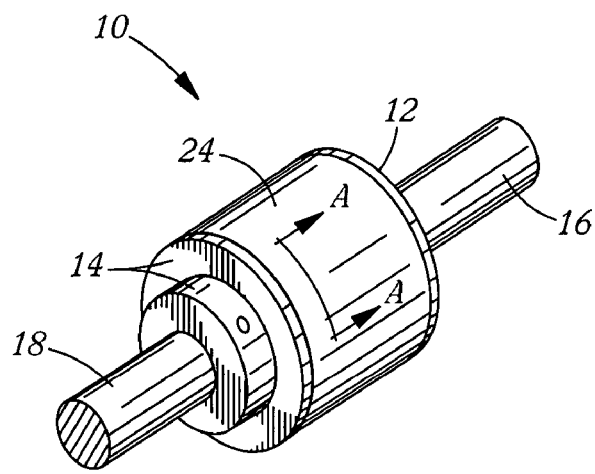
FIG. 1 is a perspective view of a flexible shaft coupling device including a coupling sleeve, both in accordance with embodiments of the present invention.
Figure 2:
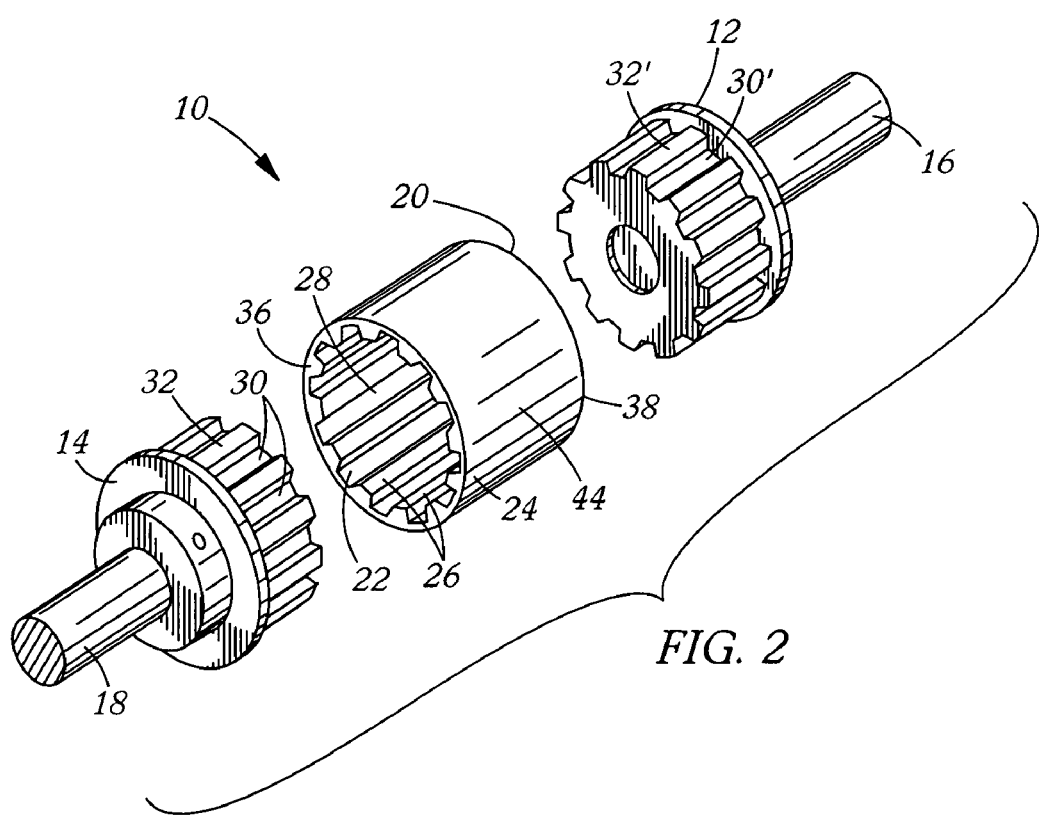
FIG. 2 is an exploded perspective view of the flexible shaft coupling device shown in FIG. 1.

A flexible shaft coupling device 10 in accordance with an embodiment of the present invention is shown in FIGS. 1 and 2, wherein the coupling device 10 comprises oppositely disposed end pieces 12, 14 to which oppositely disposed shafts 16, 18 or one or more alternative devices may be engaged by any suitable means. The coupling device 10 further comprises a flexible coupling sleeve 24, having a central generally cylindrical portion 44 and a coupling receiving portion 20, 22 at either end 36, 38 thereof. The end pieces 12, 14 may be coupled to the coupling receiving portions 20, 22 of the sleeve 24 by any suitable means. The coupling receiving portions 20, 22 include circumferentially spaced axially extending ribs or teeth 26 along at least a portion of the inner periphery 28 of the coupling sleeve 24, which teeth 26 are formed and adapted to mesh with complementary grooves 30, 30' on the outer surface 32, 32' of the end pieces 12, 14.

Figure 3:
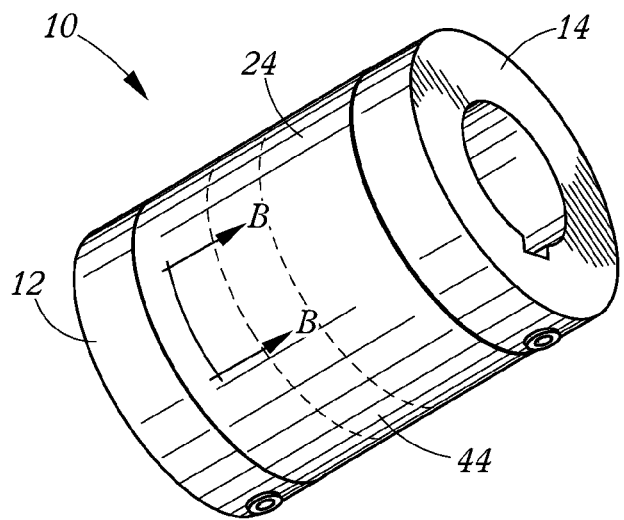
FIG. 3 is a perspective view of further embodiments of the present invention in the form of a flexible coupling device.
Figure 4:
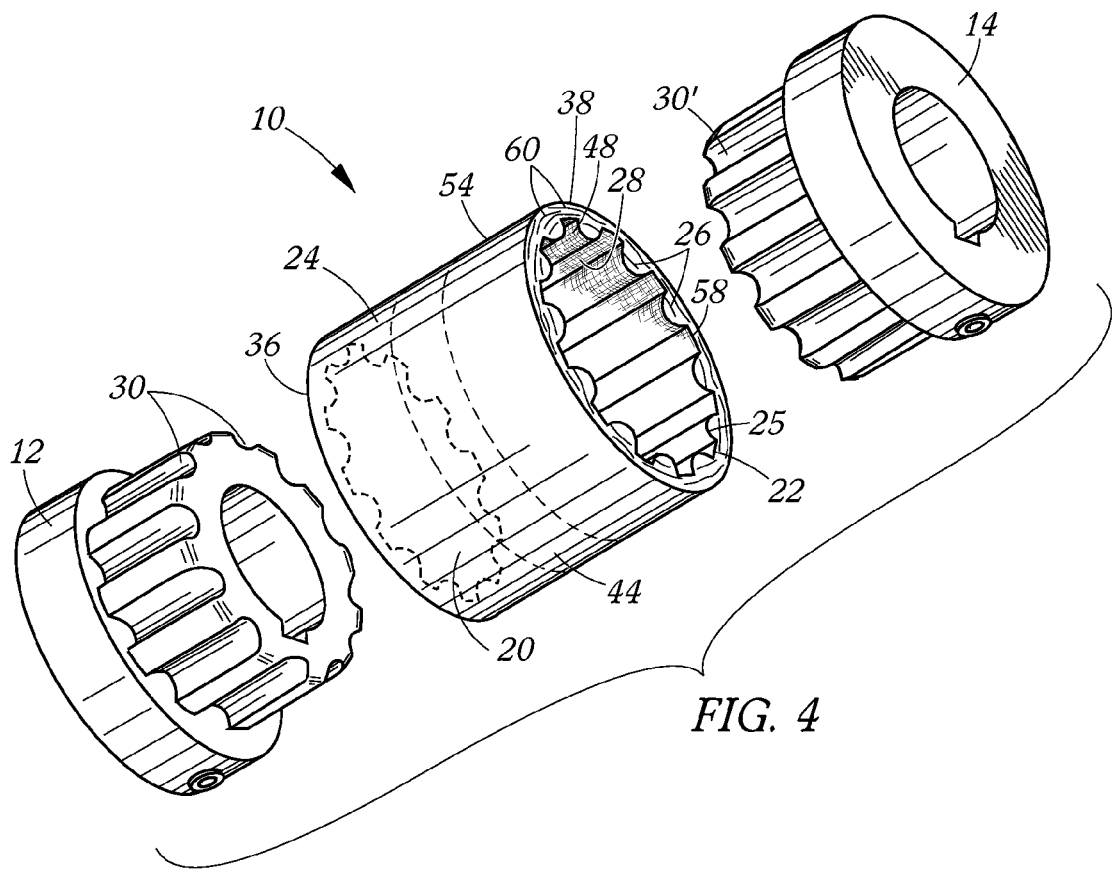
FIG. 4 is an exploded perspective view of the embodiments of the present invention shown in FIG. 3.
Figure 6:
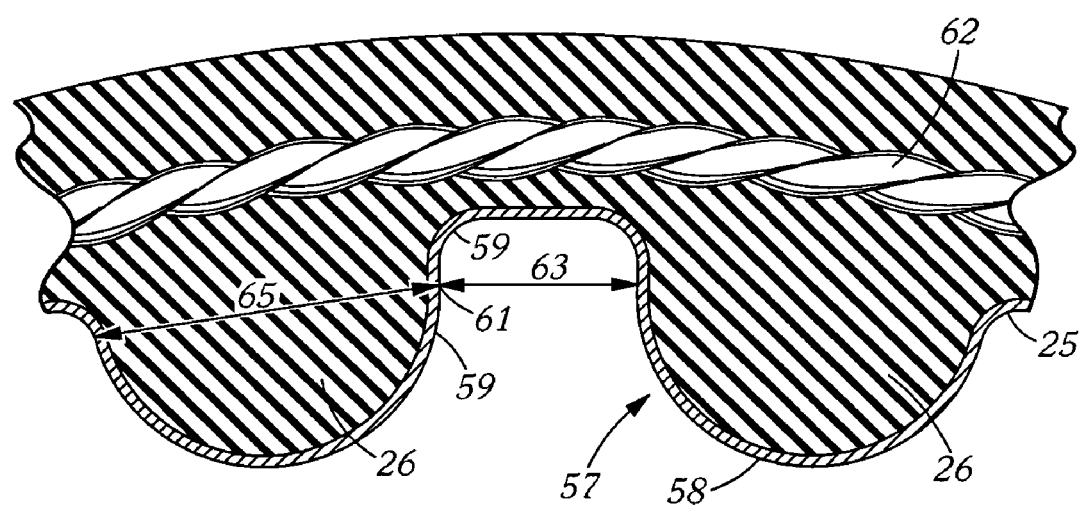
FIG. 6 is a fragmentary cross-sectional view of the tooth portion of the flexible coupling sleeve shown in FIGS. 3 and 4, taken on line B-B thereof.

As further illustrated in the embodiment of the present invention shown in FIGS. 3, 4, and 6 the sleeve 24 may furthermore include as an optional member a generally wear resistant fabric jacket 25 along its inner periphery 28, which may be bonded to at least a portion of the teeth 26, as described in aforementioned U.S. Pat. No. 6,283,868, the contents of which with regard to the types and/or forms of same is herein incorporated by reference, and as is well known in the art; and which may be formed of any suitable textile material including nylon (including nylon 6,6 and nylon 6,12), aramid, polyester or a combination of any two or more of the foregoing. The optional fabric jacket may be of any suitable weave or knit including plain, twill or satin weaves in stretch or non-stretch forms. The fabric may be characterized for example by a fabric weight of from between about 25 and about 500 g/m², or of from between about 50 and about 300 g/m², and may optionally be treated with a suitable rubber-based cement or other suitable adhesive treatment compatible with the base coupling sleeve compound.

As further illustrated in the embodiment of the present invention shown in FIGS. 3, 4 and 6, the coupling sleeve 24 may furthermore include as an optional member a reinforcement tensile member 62 helically wound, or otherwise applied, to the inner periphery 28 or to within the body of the sleeve 24, as described in aforementioned U.S. Pat. No. 6,283,868, the contents of which with regard to the types and/or forms of same is hereby incorporated herein by reference. The optional tensile member 62 may be formed of any suitable material, including glass, aramid, carbon and nylon. Such tensile member when used may be formed from any suitable material such as aramid fibers, including meta- or para-aramids, polyester fibers, polyamide fibers, cellulose fibers (e.g., rayon), carbon fibers, acrylic fibers, polyurethane fibers, cotton fibers, metal (e.g., steel) fibers and glass fibers, as well as mixtures of the foregoing, and are preferably formed of fiberglass. The tensile member may moreover be of any conventional or suitable form, including that of strain-resisting cords. The fibers may be prepared in a manner to yield a construction of from about 2 to about 100 strands/inch (0.8 to 39 strands/cm), more preferably of from about 5 to about 80 strands/inch (2 to 32 strands/cm), and most preferably of from about 8 to about 56 strands/inch (3 to 22 strands/cm).

As further illustrated in the embodiment of the present invention shown in FIGS. 3, 4 and 6, the composition of which the coupling sleeve is formed, as described in further detail below, may furthermore as an optional feature include fibers 60, as described in aforementioned U.S. Pat. No. 6,283,868, the contents of which with regard to the types and/or forms of same is hereby incorporated herein by reference. Typical fibers that can be used for this purpose include aramid fibers, such as meta- or para-aramids, polyester fibers, polyamide fibers, cellulose fibers, (e.g., rayon), carbon fibers, acrylic fibers, polyurethane fibers, cotton fibers and glass fibers, as well as mixtures of the foregoing. The fibers when utilized may be of any suitable length, e.g., in the range of from about 0.1 to about 10 mm, and may optionally be pulped to increase their surface area. Alternative fiber lengths may be in the range of from about 0.2 to about 7.5 mm, or from about 0.5 to about 3 mm. The optional fibers may moreover be otherwise treated as known in the art to improve their adhesion to the urethane. The fibers may also be mechanically fibrillated and/or may be combined with suitable resorcinol formaldehyde latex materials and/or other suitable adhesion systems that are compatible with the compound used to form the flexible coupling sleeve. Fiber loading when employed may be of any suitable level for the application and the particular type of loading material used, such as in the range of from about 0 to about 50 parts by weight per 100 parts of elastomer ("phr"), or from about 1 to about 30 phr, or in the range of from about 1 to about 10 phr.

Figure 5:
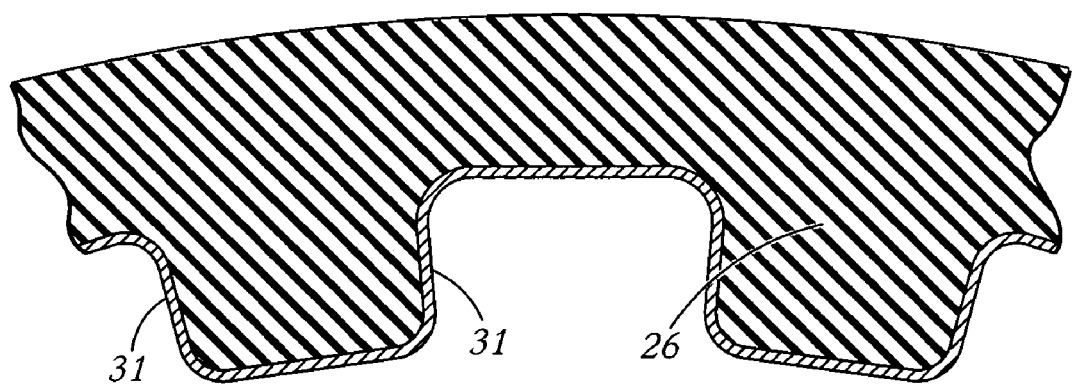
FIG. 5 is a fragmentary cross-sectional view of the tooth portion of the flexible coupling sleeve shown in FIGS. 1 and 2 taken on line A-A thereof.

As illustrated in FIG. 5, the traditional trapezoidal rib or tooth profile shown in the embodiment of the present invention illustrated in FIGS. 1 and 2 is characterized in ribs or teeth 26 having straight but sloping sides 31 and an included angle of approximately forty degrees. Coupling sleeves in accordance with the present invention may however possess any conventional and/or suitable tooth profile such as trapezoidal as shown in FIGS. 1 and 2, or curvilinear, etc.

Referring to FIGS. 3, 4 and 6, a perspective view of further embodiments of the present invention in the form of a flexible shaft coupling device 10 including a coupling sleeve 24 is shown. The device 10 comprises a flexible coupling sleeve 24 comprising a substantially flexible central generally cylindrical portion 44, as well as two oppositely disposed end pieces 12, 14 to which oppositely disposed shafts or alternative devices (not shown but conventional) may be engaged by any suitable means. As with the embodiment shown in FIG. 1, the sleeve 24 has a length extending from a first sleeve end 36 to a second sleeve end 38, each sleeve end 36, 38 defining a respective coupling receiving portion 20, 22 for engagement with the end pieces 12, 14. Coupling receiving portion 20 extends rightwardly from first end 36 to the left most dashed line indicating the left boundary of central cylindrical portion 44; coupling receiving portion 22 extends leftwardly from second sleeve end 38 to the right most dashed line indicating the right boundary of central cylindrical portion 44. The sleeve 24 has both an inner periphery 28 and an outer periphery 54. The coupling receiving portions 20, 22 comprise a plurality of axially extending ribs or teeth 26 arranged along at least a portion of the inner periphery 28 of the sleeve 24.

In this illustrated embodiment each tooth 26 has a circumferential width 65 spanning a portion or arc of the inner periphery 28. The end pieces 12, 14 possess axially extending grooves 30, 30' along their outer peripheries as shown, which grooves are formed to substantially mesh with the teeth 26 of the coupling receiving portions 20, 22. In this illustrated embodiment, each of the teeth 26 extends along at least a portion of the sleeve body inner periphery 28, but need not necessarily extend across the entire length of the inner surface thereof, and presents an area defined generally by its circumferential width and its active axial length. The sum of the tooth areas, or cumulative tooth shear area, possesses a cumulative tooth shear capacity. The central cylindrical portion 44 also possesses a shear capacity that is torsional in nature. In accordance with an embodiment of the present invention, the cumulative tooth shear capacity may exceed the annular portion torsional shear capacity, resulting in more favorable coupling failure modes. This characteristic is described in detail in U.S. Pat. No. 6,283,868, the contents of which with regard to such characteristic of this embodiment of the present invention is hereby incorporated by reference.

The sleeve 24 may furthermore optionally include any one or more of a wear resistant fabric cover 25, fiber loading 60 and a reinforcement cord or other tensile member 62 as set forth above. In the illustrated embodiment however and as further described below in relation to particular materials useful in the construction of the sleeve 24 for particular applications in accordance with one or more embodiments of the present invention, the sleeve 24 may lack all of such wear resistant fabric cover, fiber loading and a reinforcement cord.

The embodiment of the present invention shown in FIG. 4 includes teeth 26 having a curvilinear profile or contour 57 shown generally in FIG. 6. As set forth in aforementioned U.S. Pat. No. 6,283,868, an advantage is realized when a configuration of the tooth profile is selected such that the contour of the tooth section is defined by a series of connected arcs 59 and tangents 61, whereby increased torque transmission capacity results. In an embodiment of the present invention illustrated in FIGS. 3, 4 and 6, the ratio of the sum of the groove widths 63 to the sum of the tooth widths 65 is less than about 0.65:1, or is in the range of from about 0.50:1 to about 0.10:1; or is in the range of from about 0.45:1 to about 0.15:1. This ratio will hereinafter be referred to as the "groove/tooth ratio". As shown in FIG. 6, the width of the coupling sleeve grooves 63 that alternate with the teeth 26 of such sleeves, is measured from a point where the groove radius becomes tangent 61 to the tooth radius.

In accordance with an aspect of the present invention, the flexible coupling sleeve of the present invention, including at least the annular portion thereof, is formed from a polyurethane- or polyurethane/urea elastomer composition exhibiting sufficient durability to serve as a primary radial stress-resisting element of the sleeve in operation of the coupling. In one or more embodiments of the present invention, the central cylindrical portion and the toothed portions of the sleeve are integrally formed of the same polyurethane- or polyurethane/urea elastomer composition. In accordance with a further embodiment of the present invention the elastomer composition of the sleeve including both the cylindrical portion and the toothed portion thereof exhibits sufficient durability to serve as a primary- or even the sole radial stress resisting element of the sleeve, as well as a primary- or even the sole circumferential shear stress resisting element of the sleeve. Thus, in accordance with one or more embodiments of the present invention, any or all of additional reinforcement structures, e.g., any of the tensile cord 62, fiber loading 60 and fabric cover element 25, may optionally be eliminated from the sleeve construction in even highly rigorous applications, which provides beneficial cost benefits to the flexible couplings and coupling sleeves of the present invention.

One of ordinary skill in the relevant art would readily recognize that any given shaft coupling application may call for a coupling device having a different set of performance properties, including torque transmission capability, vibration- and/or noise damping characteristics and high- and/or low-temperature resistance, all over a predictable service life span. As the dimensions of the applications to which such couplings are called for have decreased in current designs, the demand for couplings having ever-increasing torque transmission capability has dramatically grown. Moreover, in automotive applications there exists the opportunity for sleeve-type coupling use in direct drive configurations, but the extremes of temperature to which such couplings would be put in operation, and the requirement of the couplings to exhibit beneficial damping characteristics in addition to high torque transmission capability at these temperature extremes, have generally precluded widespread commercial use of couplings in these systems.

One of ordinary skill in the relevant art would readily recognize that polyurethane- and polyurethane/urea elastomer composition constituents and/or their relative amounts may be variably selected to provide an elastomer composition having a combination of properties including modulus or stiffness, high- and/or low temperature resistance and flexibility, all across a broad range. It is presently believed that a coupling sleeve constructed from a polyurethane- or polyurethane/urea elastomer or thermoplastic elastomer (herein collectively, "elastomer") composition in accordance with an embodiment of the present invention provides multiple advantages over conventional coupling sleeves, as further described below.

Any conventional or suitable polyurethane- or polyurethane/urea elastomer composition exhibiting sufficient performance properties, e.g., torque transmission capability and high- and low temperature resistance, as required of a given sleeve-type flexible coupling application are contemplated within the scope of the present invention. Polyurethane elastomer compositions that may be useful in the practice of various embodiments of the present invention include for example polyether- and polyester urethanes and -urethane/ ureas (hereafter collectively, "polyurethanes"). Polyurethane elastomers that may be useful in the practice of embodiments of the present invention include the reaction products of polyisocyanate prepolymers with polyol- or diamine chain extenders or combinations of both, formed via any conventional and/or suitable molding processes, and include but are not limited to the polyurethane and polyurethane/urea elastomers described in U.S. Pat. No. 5,231,159 to Patterson et al., and International Patent Application Publication No. WO96/02584 to Wu et al., the contents of which with regard to same are hereby incorporated by reference. Polyurethane/ urea elastomers in accordance with an embodiment of the present invention may advantageously exhibit thermal stability up to in the range of about 140 to 150° C. and low temperature flexibility to in the range of about −35 to −40° C. or even lower, e.g., to −50 or −60° C.

The various reactants useful in the preparation of polyurethane/urea elastomers are known to the art. Organic polyisocyanates suitable for the polyisocyanate prepolymers useful in the practice of one or more embodiments of the present invention may possess the following characteristics: compact and symmetric structure for aromatic compounds, or trans or trans,trans geometric structure for aliphatic compounds, for improved phase separation of the resulting elastomers; and high reactivity with amine groups to reduce or eliminate the need for catalysts in the formulations, which otherwise generally accelerate reversion of the resulting elastomers at high temperatures. The polyisocyanates useful as starting components for the preparation of the polyisocyanate prepolymers include but are not limited to 4,4'-diphenyl methane diisocyanate (MDI), and compact, symmetric aromatic diisocyanates, including but not limited to para-phenylene diisocyanate (PPDI), 1,5-naphthalene diisocyanate (NDI), and 2,4- and 2,6-toluene diisocyanate (2,4-TDI and 2,6-TDI, respectively). Polyisocyanates useful as starting components for the preparation of the polyisocyanate prepolymers also include aliphatic diisocyanates with trans or trans,trans geometric configuration. These isomers are generally pure, i.e., they exist in the substantial absence of cis-configured isomers, and thus promote good phase separation once cured. These include but are not limited to trans-1,4-cyclohexane diisocyanate (t-CHDI), and trans,trans-4,4'-dicyclohexylmethyl diisocyanate (t,t-HMDI).

Polyols that may be useful in the preparation of polyisocyanate prepolymers used in various embodiments of the present invention are also generally known to the art. Suitable polyols may optionally be nonoxidative up to 150° C., and include but are not limited to polyester polyols and polycarbonate polyols. Polyether polyols are not generally favored for use in embodiments of the present invention directed to applications involving high temperature since they are susceptible to oxidation at 150° C. Polythioether polyols are similarly not preferred for such applications since they give rise to elastomers susceptible to macroradical coupling, and are therefore brittle at 150° C.

Polyester polyols useful in the preparation of the polyisocyanate prepolymers useful in various embodiments of the present invention include but are not limited to reaction products of polyhydric, including dihydric alcohols, optionally with the addition of trihydric alcohols, and polybasic, e.g., dibasic carboxylic acids. The corresponding polycarboxylic acid anhydrides or corresponding polycarboxylic acid esters of lower alcohols or mixtures thereof may be used, and/or their free polycarboxylic acid counterparts, for preparing the polyesters. The polycarboxylic acids may be aliphatic, cycloaliphatic, and/or aromatic in nature. The following are mentioned as non-limiting examples: succinic acid, adipic acid, suberic acid, azelaic acid, sebasic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, endomethylene tetrahydrophthalic acid anhydride, glutaric acid anhydride, fumaric acid, dimeric and trimeric fatty acids, optionally mixed with monomeric fatty acids, dimethylterephthalate and terephthalic acid-bis-glycol esters. Suitable polyhydric alcohols used to produce such polyesters include but are not limited to the following; ethylene glycol, 1,2- and 1,3-propylene glycol, 1,4- and 2,3-butylene glycol, 1,6-hexanediol, 1,8-octanediol, 1,10-decanediol, neopentyl glycol, 1,4-cyclohexane dimethanol or 1,4-bis-hydroxymethylcyclohexane, 2-methyl-1,3-propanediol, glycerol, trimethylopropane, 1,2,6-hexanetriol, 1,2,4-butanetriol, trimethylolethane, and mixtures thereof. Polyesters of lactones, such as ε-caprolactone, and hydroxycarboxylic acids, such as ω-hydroxycaproic acid, may also be used.

Suitable polycarbonate polyols are known and may be prepared, for example, by the reaction of diols, such as 1,3-propanediol, 1,4-butanediol, 1,6-hexanediol, 1,10-decanediol, neopentyl glycol, diethylene glycol, triethylene glycol or tetraethylene glycol, and mixtures thereof, with diaryl carbonates, e.g. diphenyl carbonate, dialkyl carbonate, e.g. diethyl carbonate, or phosgene.

Polycarbonate polyols and polyester polyols with molecular weights in the range of from about 500 to about 5000, or in the range of from about 1500 to about 2000, or mixtures of these polyols, may beneficially be employed. These may include poly(hexamethylene carbonate) diol, polycaprolactone diol, and poly(hexamethylene adipate) diol, and their -triol counterparts. The polyols may optionally be dried to a moisture level of less than about 0.03%, or to a level of about 0.015% prior to reaction with the diisocyanates to form the polyisocyanate prepolymers useful in embodiments of the present invention.

Many polyisocyanate prepolymers are also commercially available and may be beneficially employed in the practice of one or more embodiments of the present invention; and include those generally referred to as "low free" prepolymers as described for example in U.S. Pat. No. 6,174,984 to Peter, U.S. Pat. No. 5,703,193 to Rosenberg, U.S. Pat. Appln. No. U.S. 2003/0065124 to Rosenberg and U.S. Pat. No. 6,046,297 to Rosenberg et al., in which the level of free diisocyanate in the prepolymer is reduced to a level of, e.g., less than 1% of the prepolymer, or less than 0.5%, or less than 0.25%, e.g., about 0.1% or lower. As noted in aforementioned WO96/02584 to Wu et al., an increase in the thermal stability of polyurethane elastomers is achieved when utilizing, e.g., PPDI instead of MDI as a result of the former's higher isocyanate reactivity differential, which results in a decrease in oligomer formation and a proportionate decrease in the level of free diisocyanate in the prepolymer. Consequently, these prepolymers promote greater phase separation of the hard and soft segments and hence improved thermal stability of the resultant elastomer.

The use of diamine chain extenders, while generally more difficult to process than diol chain extenders due to their higher melting points, contribute greater thermal stability via urea linkages which are more stable than their urethane counterparts. Diamine chain extenders useful in various embodiments of the present invention and particularly those involving exposure to high temperatures may beneficially possess the following three characteristics: symmetric structure for improved phase separation of the resulting elastomers; non-bulky substitute groups on the aromatic rings if such groups are present in order that hard segment crystallization and overall phase separation of the resulting elastomers is not retarded; and proper reactivity with isocyanate group thus reducing or eliminating the need for catalysts in the formulations. Primary diamine chain extenders may be employed for proper reactivity with particular prepolymers set forth above.

Symmetric primary diamine chain extenders useful in the preparation of polyurethane/urea elastomers in accordance with an embodiment of the present invention are those capable of reacting with polyisocyanate prepolymers rapidly without the need for catalysts. In addition, these chain extenders contribute to the excellent dynamic performance of the resulting elastomers. The symmetry of the chain extenders useful in an embodiment of the present invention provides improved phase separation and hence increase the thermal stability of the final polyurethane/urea elastomers in dynamic applications. Suitable primary diamine chain extenders include but are not limited to symmetric aromatic amines with molecular weights of from about 90 to about 500, and mixtures thereof. Examples include: 1,4-phenylenediamine, 2,6-diaminotoluene, 1,5-naphthalenediamine, 4,4'-diaminodiphenyl methane, 3,3'-dimethyl-4,4'-diaminodiphenyl methane, 1-methyl-3,5-bis(methylthio)-2,6-diaminobenzene, 1-methyl-3,5-diethyl-2,6-diaminobenzene, 4,4'-methylene-bis-(3-chloro-2,6-diethylaniline), 4,4'-methylene-bis-(ortho-chloroaniline), 4,4'-methylene-bis-(2,3-dichloroaniline), trimethylene glycol di-para-aminobenzoate, 4,4'-methylene-bis-(2,6-diethylaniline), 4,4'-methylene-bis-(2,6-diisopropylaniline), 4,4'-methylene-bis-(2-methyl-6-isopropylaniline), 4,4'-diamino diphenyl sulfone, and the like.

The symmetric primary diamine chain extenders may optionally be combined with a small amount of secondary diamine chain extenders in order to vary elastomer characteristics such as hardness. Suitable examples of secondary diamine chain extenders have molecular weights of from about 150 to about 500, and include but are not limited to N,N'-di-sec-butyl-amino benzene and N,N'-di-sec-butyl-amino-diphenylmethane.

The symmetric primary diamine chain extenders may also be combined with one or more of the polyols described above and contained in the prepolymer, in order to alter process and product characteristics such as mixing ratio, processing temperature, flexibility, etc. These long chain polyols do not act as chain extenders, but reduce the amount of hard segment in the elastomer, thus reducing its shardness. This may be desirable for some applications. Suitable weight ratios of polyol to symmetric primary diamine chain extender may be from about 30:70 to about 60:40, and is more preferably from about 40:60 to about 50:50.

Neither aliphatic nor aromatic short chain hydroxyl compounds are generally favored as chain extenders in the practice of the present invention when employed to form couplings for use at high temperatures due to the instability of urethane linkages in the resulting elastomers at high temperatures, and their inadequate dynamic properties in applications at high temperatures.

Polyurethane/urea elastomers useful in the practice of embodiments of the present invention may be prepared utilizing any suitable or conventional process, any number of which are well known in the art, including a two-step (prepolymer) approach via standard molding processes. In the first step of the prepolymer approach, the polyol or polyol mixture and the polyisocyanate are reacted to yield the polyisocyanate prepolymer. In the second step, the polyisocyanate prepolymer and the chain extender are reacted to produce the final polyurethane/urea elastomers. A favorable criteria for choosing the order of addition is that which will minimize the amount of oligomers for the reasons set forth above, and which in addition generally induce processing difficulties in the form of high prepolymer viscosity. Other factors should also be considered in choosing the order of addition for preparing polyisocyanate prepolymers, as is well known in the art. It is known, for example, that if the polyol component is added into liquid PPDI at a temperature above its melting point of 95° C., a high degree of dimerization and sublimation of PPDI takes place. If required, a small amount of stabilizer, such as benzoyl chloride, may be added into the polyisocyanate prepolymer during its preparation stage. A mixing ratio of polyisocyanate to polyol expressed as a stoichiometric ratio of NCO/OH that may be employed in one or more embodiments of the present invention is from about 1.8:1 to about 2.4:1, and, for prepolymers based on PPDI, may be about 2:1, and for prepolymers based on t,t-HMDI, may be about 2.2:1. Polyisocyanate prepolymers useful in various embodiments of the present invention may include an isocyanate group content in the range of from about 2.0 to about 12.0 weight percent NCO; or in the range of from about 2.5 to about 7.0 weight percent NCO; or in the range of from about 3.0 to about 6.0 weight percent NCO.

The polyisocyanate prepolymers useful in the practice of embodiments of the present invention may be reacted via standard molding processes with a chain extender as known in the polyurethane/urea art. The polyurethane/urea elastomers of the present invention may incorporate an isocyanate to amine ("NCO:$NH_x$") or -amine/hydroxyl ("NCO:$NH_2$+OH") equivalent ratio in the range of from about 0.90:1 to about 1.40:1; or in the range of from about 1.00:1 to about 1.25:1.

While in light of the description of various embodiments of the present invention provided herein one of ordinary skill in the relevant art would readily perceive any number of polyurethane constituents and their relative amounts in the preparation of flexible couplings sleeves for applications calling for any number of performance requirements, e.g., load capacity, damping characteristics, high- and/or low-temperature resistance. For example, while a polyurethane elastomer having excellent high temperature performance characteristics could be formed utilizing the constituents and relative amounts set forth below in Table 1 as Examples 1 and 2 to form highly durable coupling sleeves suitable for use in even the extremely high- and low temperature extreme conditions characteristic of automotive applications, in applications generally involving lower operating temperature ranges, e.g., certain industrial applications, then cost savings may be realized by utilizing a combination of polyurethane constituents, e.g., non-"low-free" PPDI or 2,4- or 2,6-TDI, or MDI in combination with suitable polyol and chain extender, to form lower temperature-resistant but nonetheless highly durable coupling sleeves. For moderate- to lower temperature resistant but nonetheless highly durable coupling sleeves, polyether polyols may be utilized. In addition to diamine, short chain diol chain extenders may also be acceptable for lower temperature applications, e.g., 1,4-butanediol may be used to cure with a prepolymer such as that available as ADIPRENE LFP 2950A from Uniroyal Chemical to form this type of polyurethane elastomer. Suitable thermoplastic polyurethane elastomers may moreover be utilized, e.g., where extreme thermal stability is not required by the intended application.

Moreover, while one of ordinary skill in the relevant art would readily recognize that polyurethane elastomers may be formed having a broad range of properties, including hardness or modulus, flexibility, load-carrying capability, damping characteristics, and high- and/or low temperature resistance; a minimum polyurethane elastomer hardness and/or modulus would generally be required in order for the polyurethane elastomer to function acceptably when formed into a coupling sleeve. Thus for example, polyurethane elastomers having a modulus as measured in accordance with ASTM D412 at 23° C. (M100) of at least about 800 psi would generally be required for the coupling sleeves in accordance with the present invention. Polyurethane elastomers having an M100 of at least about 900 psi, or in the range of from about 1000 to about 2000 psi may moreover be utilized advantageously in accordance with embodiments of the present invention.

Though not intending to be limited to any particular theory, it is moreover presently believed that the load capacity of a given polyurethane elastomer coupling sleeve is moreover generally proportional to the hardness or modulus of that elastomer, while the damping capability of the sleeve is generally inversely proportional thereto. One of ordinary skill in the relevant art would thus readily recognize in view of the present disclosure that there may be some fine-tuning or interplay of these two properties that may be accomplished through the selection of polyurethane constituents and/or their relative amounts that may be desirable or necessary in order to formulate the optimal polyurethane elastomer for a given intended application, e.g., in various automotive accessory drive applications.

The polyurethane elastomers useful in the practice of various embodiments of the present invention may be mixed with additives such as pigments, colorants, antistatic agents, etc. as well known in the art and as desired for a given coupling application.

It is presently believed that the absence of fillers, e.g., carbon black, silicas, etc., and other conventional synthetic rubber composition additives in the polyurethane elastomer compositions useful in the practice of the present invention further contribute to the excellent performance properties specific to sleeve-type couplings. It is believed that such additives, which are generally employed in synthetic rubber compounding of, e.g., diene based elastomers in part to increase the modulus and associated performance properties of such materials, result in a composition which is not truly homogenous but instead includes at least some discrete particles within the larger continuous phase. Each such particle presents a potential crack initiation point in the elastomer composition, which generally cause the cured composition to fail under extreme loading and/or temperature conditions. The polyurethane elastomer compositions conversely do not require such additives and thus form a more homogenous material which has been found to be highly advantageous in the practice of the present invention.

The present invention is further illustrated but is not intended to be limited by the following examples in which all parts and percentages are by weight unless otherwise specified. In each case shown in Table 1 the polyisocyanate prepolymer was held at 60-80° C., and then mixed and cured with its chain extender and at the relevant mixing ratio therewith as indicated in Table 1, at above the constituents' respective melting points to obtain the corresponding polyurethane/urea elastomers, in appropriately dimensioned molds that were preheated to 110° C. The elastomer samples were demolded within about 10-30 minutes and then post-cured at 150° C. for 24 hours.

The above-described polyurethane/urea samples were tested for hardness (ASTM D-2240), and modulus of unaged samples (ASTM D-412).

TABLE 1

|  | Example 1 | Example 2 |
| --- | --- | --- |
| Prepolymer | PPDI/PCL | PPDI/PCL |
| Chain Extender | TMAB | MCDEA |
| NCO % | 5.49 | 3.75 |
| NCO:NH$_2$ | 1.25:1 | 1:1 |
| Shore A | 94 | 95 |
| M100 (psi) | 1650 | 1600 |

In Table 1:
PPDI/PCL - low free PPDI-difunctional polycapralactone prepolymer available as ADI-PRENE LFP 2950A from Uniroyal Chemical.
TMAB - trimethylene glycol di-para-aminobenzoate available as VIBRACURE A157 from Uniroyal Chemical, or VERSALINK 740M from Air Products and Chemicals, Inc..
MCDEA = 4,4'-methylene-bis-(3-chloro-2,6-dimethylaniline), available as LONZACURE MCDEA from Air Products and Chemicals, Inc.

In operation of sleeve-type flexible shaft couplings, rotation of a driver shaft exerts a driving force to the end piece to which it is coupled, across the corresponding teeth of the end piece and the coupling receiving portion of the sleeve, to and across the central cylindrical portion of the sleeve causing it to twist and thereby exert a torque across it's length and into and across the teeth of the opposite coupling receiving portion and corresponding end piece and ultimately to the driven shaft, thus inducing the driven shaft to rotate. The driving force thus expresses both a radial stress component, which in conventional constructions is typically opposed or resisted by some element within or upon the central annular portion; and a circumferential shear stress component, which is generally opposed by the resilience of the coupling sleeve's teeth. The flexible coupling sleeves in accordance with an embodiment of the present invention have been found to exhibit improved load capacities over conventional couplings having sleeve portions formed of vulcanized synthetic rubber. What is meant by the term, "load capacity" in this context is the capacity of the device to withstand or resist the overall driving force to which it is subjected in use. Load capacity in this context thus includes resistance to torque transmission-, amplitude- and frequency components, as well as radial stress- and circumferential shear stress components.

To illustrate the improved load capacity and hence operational life that can be expected from a flexible coupling of the present invention over prior art designs, a load capacity analysis was performed on samples of flexible coupling devices prepared in accordance with embodiments of the present invention. Coupling sleeves of two different sizes but in each case formed entirely of the compositions described as Examples 1 and 2 in Table 1, and having a tooth profile configuration as illustrated in FIG. 4 above were prepared. Sleeves of a first size, denoted as "Size A" in Table 2 below, included an outside diameter of 28.5 mm, a shell thickness (i.e., measured from land portion between teeth to outer surface of sleeve) of 2.57 mm, a groove to tooth ratio of approximately 2.9, twelve teeth per coupling receiving portion, a tooth base width of approximately 4.3 mm and a tooth height of approximately 2 mm. Sleeves of a second size, denoted as "Size B" in Table 2 below, included an outside diameter of approximately 78.5 mm, a shell thickness of 7 mm, a groove to tooth ratio of approximately 2.2, eighteen teeth per coupling receiving portion, a tooth base width of approximately 7.5 mm and a tooth height of approximately 3.4 mm. For each coupling sleeve, the sleeve-shaped body including the central annular portion and the coupling receiving portions including each of the teeth were formed entirely of the respective polyurethane composition set forth in Table 2, i.e., in each case, neither a tensile cord, fiber loading or fabric jacket was included in the coupling sleeve construction.

TABLE 2

|  | Sleeve I | Sleeve II | Sleeve III |
| --- | --- | --- | --- |
| Sleeve Composition | Example 1 | Example 2 | Example 2 |
| Coupling Size | A | A | B |

The sleeves were in each case subjected to a load capacity analysis and the results of the analysis are set forth below. The load capacity analysis measured operating life in cycles to failure against peak torque (Nm), as set forth in Deutsch Industrie Norm ("DIN") 740. The analysis was performed on a torsional pulsating load tester at a rate in the range of 8-9 Hz, and at ambient temperature of about 23° C. For Sleeves I and -II the analysis involved a peak-to-peak torque oscillation range of between about 14 and about 34 Nm, and for Sleeve III it involved a peak-to-peak torque oscillation range of between about 130 and about 190 Nm.

At the 30 to 34 Nm peak torque range, Sleeve I test specimens exhibited between fifteen thousand and thirty thousand stress cycles prior to failure. At a peak torque of about 22 Nm, a Sleeve I test specimen exhibited over five hundred thousand stress cycles, and at a peak torque of approximately 18 Nm, a Sleeve I test specimen exhibited nearly six million stress cycles prior to failure. Even more dramatically, Sleeve II exhibited over two million stress cycles at a peak torque of approximately 30 Nm. At a peak torque of approximately 160 Nm, the Sleeve III test specimen has not yet failed at over $10^7$ stress cycles when analyzed at approximately 23° C.

In addition to the analysis performed at room temperature, a number of coupling sleeve test specimens as described as Sleeve I in Table 2 were analyzed at elevated temperatures. Each such specimen was subjected to this same load capacity analysis, but in each case performed at one of each 10° C. increment over the temperature range of 50° C. to 130° C. With a peak torque remaining consistently between 24 and 28

Nm, these sleeves performed in each case between five hundred thousand and $10^6$ stress cycles. In addition, when analyzed at 130° C., a Size A sleeve formed entirely of a polyurethane elastomer composition substantially similar to that described as Example 2 above but including 5% by weight of a trifunctional polycaprolactone polyol in the otherwise similar low free PPDI/PCL prepolymer, did not fail for over two hundred thousand stress cycles at a peak torque of approximately 28 Nm; and remained on test for over two million stress cycles at a peak torque level of approximately 25 Nm.

From a review of these results, it is clear that testing over a range of oscillating torque conditions indicates exceptional performance of flexible coupling sleeves prepared in accordance with various embodiments of the present invention. The test results set forth above reveal that coupling sleeves in accordance with various embodiments of the present invention exhibit such exceptional load capacity, even under a broad range of operating temperatures, that as illustrated in the embodiment of the present invention described in FIG. 2, it has been found that no reinforcement, e.g., a tensile cord or a reinforcing fabric, other than the polyurethane elastomer itself is generally needed to withstand the driving force, including both radial stress- and circumferential sheer stress components, of even highly rigorous applications, and that an exceptionally high degree of torque transmission capacity is nonetheless maintained. When employing the high temperature resistant polyurethane elastomer compositions illustrated in the examples provided above in the construction of a coupling sleeve in accordance with an embodiment of the present invention, it is anticipated that the subject couplings would provide great benefits in automotive applications.

It is moreover presently believed that the absence of a combination of textile reinforcement in the polyurethane coupling sleeves according to certain embodiments of the present invention, i.e., of a tensile cord and a fabric jacket, may further contribute to the extremely high durability of coupling sleeves and couplings in accordance with these embodiments of the invention, particularly under extremely high load conditions. In particular, it has been found that sleeve failure cracks which generally lead to coupling failure generally initiate at the sleeve's tensile cord-fabric jacket interface. This problem is solved in those polyurethane coupling sleeves of embodiments of the present invention which lack the combination of a tensile cord and a fabric jacket. These textile reinforcement features can generally not be eliminated in coupling sleeves formed of vulcanizable synthetic rubber due to their lower modulus compared to the polyurethane elastomers of the present invention.

While no reinforcement material, e.g., tensile cord, fiber loading or fabric jacket, was utilized in the examples provided herein to illustrate aspects of the present invention, it is not intended that the scope of the present invention should be so limited, and that any or all of a tensile cord, fiber loading and a textile jacket or further reinforcement or a combination of any two or more thereof may be employed in the construction of the polyurethane elastomer coupling sleeves of one or more embodiments of the present invention to further provide radial- and/or circumferential shear stress resistance, or to further adjust the coupling's torque transmission capacity for a given application. Thus for example while as illustrated in the examples provided above, the polyurethane elastomer itself may provide the primary or sole radial- and/or circumferential shear stress resistance of the sleeve, it has been found that the utilization of a tensile cord as described above in relation to FIGS. 3 and 4 may further increase the load capacity of the coupling sleeve.

The flexible coupling sleeves and coupling devices of the present invention may be formed according to any suitable and/or conventional method, which methods are generally well known to the art. For the coupling sleeves themselves, the polyurethane or polyurethane/urea based elastomer compositions may be prepared according to any conventional or suitable technique, e.g., by reacting the relatively high molecular weight polyol, and the relatively low molecular weight chain extender, with the polyisocyanate via either one-shot or two-step (prepolymer) approach. In preparing the elastomer, the reactive components and any catalysts or optional additives may be blended together and then transferred to a mold of suitable shape where the formulation is cured. This blending may for example be accomplished in a batch process. The mixture may be cured in the mold until it is capable of maintaining the molded shape, demolded and postcured until polymerization is complete. Alternatively, the elastomer may be prepared via Reaction Injection Molding (RIM) techniques, in which the active hydrogen containing materials are mixed rapidly with polyisocyanate via impingement and simultaneously injected into a suitably shaped mold where the reaction takes place. Where thermoplastic polyurethane elastomers would be employed in the construction of a coupling sleeve in accordance with an embodiment of the present invention, the material may be formed by melting a pre-formed polyurethane elastomer and then injection molding the melt into a suitably shaped mold to produce the sleeve, as would be well recognized by one of ordinary skill in the relevant art.

When incorporating any one or more of a tensile cord, a fabric jacket and elastomer fiber loading, the flexible coupling sleeves may be formed according to standard urethane belt-building techniques, wherein for example the optionally pre-formed wear resistant fabric jacket is placed in a toothed mold, the optional reinforcement cord is helically wound against the fabric, the polyurethane elastomer constituents are introduced to the mold as noted above, and sufficient heat and pressure are applied to force the mixture of constituents to flow through the tensile cords carrying the fabric into the mold grooves, and the resultant flexible coupling sleeve is cooled and removed from the mold. While not intending to be limited to any particular theory, it is believed that greater adhesion may be achieved in coupling sleeves employing both a polyurethane elastomer flexible portion and one or more textile reinforcement materials as compared to comparable couplings having vulcanizable rubber flexible portions, due to the liquid, low viscosity urethane mixture which generally flows through the textile member in formation of the sleeve, as opposed to the generally high viscosity of conventional vulcanizable rubber. This improved adhesion would likely further result in improved durability and service life.

As noted above, irrespective of whether the tooth profile employed in the construction of a coupling sleeve in accordance with one or more embodiments of the present invention is selected to be trapezoidal- or the curvilinear-, or any other suitable and/or conventional form, it is believed that the flexible coupling sleeves formed of polyurethane elastomer as described herein would form a highly reliable and exceptionally durable coupling device in combination with associated end pieces. In accordance with various embodiments of the present invention, coupling sleeves for utilization in flexible shaft couplings of the sleeve-type may be formed primarily, or solely of polyurethane elastomer, and the need for an additional reinforcement member, e.g., a tensile cord or a fabric jacket, in such construction may be eliminated, since the polyurethane elastomer composition itself could provide the primary or sole radial- and shear stress resisting element of the coupling's sleeve.

The polyurethane/urea elastomers set forth in the above examples illustrate combinations of hard and soft segments formed by the reaction of the above constituents in accordance with various embodiments of the present invention. The constituents in various embodiments of the present invention may be selected to promote phase separation, eliminate the need for catalysts and antioxidants thus increasing thermal stability, and improve the dynamic performance of the final elastomer composition at high and low temperatures. One of ordinary skill in the relevant art would readily recognize however the modifications and substitutions of the various materials that could be made for example, where performance at elevated and/or extremes of temperature is not required in or for a given application.

Although the present invention has been described in detail for the purpose of illustration, it is to be understood that such detail is solely for that purpose and that variations can be made therein by one skilled in the art without departing from the spirit or scope of the present invention except as it may be limited by the claims. The invention disclosed herein may suitably be practiced in the absence of any element which is not specifically disclosed herein.

What is claimed is:

1. A coupling sleeve for use in a sleeve-type flexible shaft coupling device having two substantially coaxial end pieces, comprising a generally annular body having an inner periphery and an outer periphery; said body comprising a central cylindrical portion and two opposing sleeve end portions at either end of said central cylindrical portion of generally cylindrical shape defining respective coupling receiving portions which coaxially mate in rotational driving relation with said end pieces of the coupling device; said coupling receiving portions each comprising a plurality of circumferentially spaced axially extending teeth arranged along at least a portion of said inner periphery which substantially mesh with complementary grooves in the outer periphery of said end pieces, and characterized in that at least one of said central cylindrical portion and said coupling receiving portions comprises a polyurethane elastomer composition exhibiting thermal stability in the range from about −35° C. to at least about 140° C., and wherein said coupling sleeve possesses an M100 of at least about 1000 psi; and wherein said coupling sleeve has a ratio of outside diameter to shell thickness of from about 8 to about 11.

2. The coupling sleeve of claim 1 wherein said annular body comprises said polyurethane elastomer composition and said composition provides the primary or sole amount of said coupling sleeve's resistance to radial stress.

3. The coupling sleeve of claim 2, wherein said central cylindrical portion comprises said polyurethane elastomer composition and said composition provides the primary or sole amount of said coupling sleeve's resistance to circumferential shear stress.

4. A coupling sleeve for use in a sleeve-type flexible shaft coupling device having two substantially coaxial end pieces, comprising a generally annular body having an inner periphery and an outer periphery; said body comprising a central cylindrical portion adapted to resist torsional stress and two opposing sleeve end portions of generally cylindrical shape defining respective coupling receiving portions which coaxially mate in rotational driving relation with said end pieces of the coupling device; said coupling receiving portions each comprising a plurality of circumferentially spaced axially extending teeth arranged along at least a portion of said inner periphery which substantially mesh with complementary grooves in the outer periphery of said end pieces, and characterized in that at least one of said central cylindrical portion and said coupling receiving portions comprises a polyurethane elastomer wherein said polyurethane elastomer composition possesses urea linkages and comprises the reaction product of, (a) a polyisocyanate prepolymer composition being prepared by reacting,
(i) a diisocyanate selected from the group consisting of;
(A) aromatic diisocyanates with compact and symmetric structure, and
(B) aliphatic diisocyanates with trans or trans, trans geometric structure,
with;
(ii) a polyol selected from;
(A) polycarbonate polyols,
(B) polyester polyols, and
(C) a mixture of any two or more of said polycarbonate polyols and said polyester polyols,
and;
(b) a chain extender selected from;
(i) symmetric primary diamine chain extenders,
(ii) a mixture of any one or more said symmetric primary diamine chain extenders and a secondary diamine chain extender, and,
(iii) a mixture of any one or more said symmetric primary diamine chain extenders and any one or more said polyols;

and wherein said coupling sleeve has a ratio of outside diameter to shell thickness of from about 8 to about 11.

5. The coupling sleeve of claim 4 wherein said polyurethane elastomer composition possesses an isocyanate to amine or amine/hydroxyl equivalent ratio in the range of from about 0.90:1 to about 1.40:1.

6. The coupling sleeve of claim 4 wherein said polyurethane elastomer composition possesses an isocyanate group content of said polyisocyanate prepolymer of from about 2.0% to about 12.0% by weight.

7. The coupling sleeve of claim 6 wherein said polyurethane elastomer composition possesses said isocyanate group content of said polyisocyanate prepolymer in the range of from about 2.5% to about 7.0% by weight.

8. The coupling sleeve of claim 6 wherein said polyurethane elastomer composition wherein said isocyanate group content of said polyisocyanate prepolymer is in the range of from about 3.0% to about 6.0% by weight.

9. The coupling sleeve of claim 4 wherein said polyisocyanate prepolymer composition has an NCO/OH ratio of from about 1.8:1 to about 2.4:1.

10. The coupling sleeve of claim 4 wherein said diisocyanate is said aromatic diisocyanate and is selected from the group consisting of;
(a) para-phenylene diisocyanate,
(b) 1,5-naphthalene diisocyanate, and
(c) 2,6-toluene diisocyanate.

11. The coupling sleeve of claim 4 wherein said polyisocyanate prepolymer composition is based on para-phenylene diisocyanate, and has an NCO/OH ratio of about 2:1.

12. The coupling sleeve of claim 4 wherein said diisocyanate is said aliphatic diisocyanate and is selected from the group consisting of,
(a) trans-1,4-cyclohexane diisocyanate, and
(b) trans,trans-4,4'-dicyclohexylmethyl diisocyanate.

13. The coupling sleeve of claim 4 wherein said polyisocyanate prepolymer composition is based on trans-1,4-cyclohexane diisocyanate, and has an NCO/OH ratio of about 2.2:1.

14. The coupling sleeve of claim 4 wherein said polyol contains less than about 0.03% water.

15. The coupling sleeve of claim 4 wherein said polyol is said polycarbonate polyol and has molecular weight of from about 500 to about 5000.

16. The coupling sleeve of claim 4 wherein said polycarbonate polyol is poly(hexamethylene carbonate) diol and has molecular weight of from about 500 to about 5000.

17. The coupling sleeve of claim 4 wherein said poly(hexamethylene carbonate) diol has molecular weight of from about 1500 to about 2500.

18. The coupling sleeve of claim 4 wherein said polyol is said polyester polyol and has molecular weight of from about 500 to about 5000.

19. The coupling sleeve of claim 4 wherein said polyester polyol is polycaprolactone diol and has molecular weights of from about 500 to about 5000.

20. The coupling sleeve of claim 4 wherein said polycaprolactone diol has molecular weights of from about 1500 to about 2500.

21. The coupling sleeve of claim 4 wherein said polyester polyol is poly(hexamethylene adipate) diol and has molecular weight of from about 500 to about 5000.

22. The coupling sleeve of claim 4 wherein said poly(hexamethylene adipate) diol has molecular weight of from about 1500 to about 2500.

23. The coupling sleeve of claim 4 wherein said chain extender is said symmetric primary diamine chain extender and has molecular weight of from about 90 to about 500.

24. The coupling sleeve of claim 4 wherein said symmetric primary diamine chain extender is selected from the group consisting of:
    (a) 4,4'-methylene-bis-(3-chloro-2,6-diethylaniline),
    (b) 4,4'-methylene-bis-(ortho-chloroaniline),
    (c) 4,4'-methylene-bis-(2,3-dichloroaniline),
    (d) trimethylene glycol di-para-aminobenzoate,
    (e) 4,4'-methylene-bis(2,6-diethylaniline),
    (f) 4,4'-methylene-bis(2,6-diisopropylaniline),
    (g) 4,4'-methylene-bis(2-methyl-6-isopropylaniline), and
    (h) a combination of at least any two of the foregoing symmetric primary diamine chain extenders.

25. The coupling sleeve of claim 4 wherein said chain extender is said mixture of said symmetric primary diamine chain extenders and secondary diamine chain extenders and said secondary diamine chain extenders have molecular weight of from about 150 to about 500.

26. The coupling sleeve of claim 4 wherein said secondary diamine chain extender is selected from the group consisting of:
    (a) N,N'-di-sec-butyl-amino-benzene, and
    (b) N,N'-di-sec-butyl-amino-diphenylmethane.

27. The coupling sleeve of claim 4 wherein said secondary diamine chain extender comprises up to about 25% by weight of said mixture of said symmetric primary diamine chain extenders and said secondary diamine chain extenders.

28. The coupling sleeve of claim 4 wherein said chain extender is said mixture of said symmetric primary diamine chain extenders and said polyols, and said polyols comprise up to about 40% to 50% by weight of said mixture of said symmetric primary diamine chain extenders and said polyols.

29. The coupling sleeve of claim 1 constructed in the absence of at least one of a tensile member, a fabric jacket and fiber loading of said composition.

30. The coupling sleeve of claim 29 constructed in the absence of both a tensile member and a fabric jacket.

31. The coupling sleeve of claim 1, wherein at least one of said teeth possesses a curvilinear cross-sectional profile.

32. The coupling sleeve of claim 1, wherein said teeth are in alternating arrangement with a plurality of grooves, each of said grooves having a width spanning a portion of the circumference of the sleeve-shaped body inner periphery, and wherein the ratio of the sum of said groove widths to the sum of said tooth widths is less than 0.65:1.

33. The coupling sleeve of claim 3 wherein the ratio of said sum of said groove widths to said sum of said tooth widths from 0:50:1 to 0.10:1.

34. The coupling sleeve of claim 3 wherein the ratio of said sum of said groove widths to said sum of said tooth widths is from 0.45:1 to 0.15:1.

35. The coupling sleeve of claim 1 further comprising a tensile member disposed within said sleeve-shaped body.

36. The coupling sleeve of claim 1 wherein said elastomeric material further comprises from about 1 to about 30 phr of fibers.

37. The coupling sleeve of claim 1 further comprising at least one torque level indicating means on said outer periphery of said sleeve body.

38. The coupling sleeve of claim 37 wherein said torque level indicating means is in the form of graphic elements which form a first pattern on said outer periphery of said sleeve-shaped body at rest, and a second pattern on said outer periphery of said sleeve-shaped body under surface distortion.

39. A coupling sleeve for use in a sleeve-type flexible shaft coupling device having two substantially coaxial end pieces, comprising a resilient, generally annular body having an inner periphery and an outer periphery; said body comprising a central cylindrical portion adapted to resist torsional stress and two opposing sleeve end portions of generally cylindrical shape defining respective coupling receiving portions at either end of said central cylindrical portion which coaxially mate in rotational driving relation with said end pieces of the coupling device; said coupling receiving portions each comprising a plurality of circumferentially spaced axially extending teeth arranged along at least a portion of said inner periphery which substantially mesh with complementary grooves in the outer periphery of said end pieces, and characterized in that at least one of said central cylindrical portion and said coupling receiving portions comprises a polyurethane elastomer composition, wherein said polyurethane elastomer possesses an M100 of at least about 800 psi; and wherein said coupling sleeve has a ratio of outside diameter to shell thickness of from about 8 to about 11.

40. The coupling sleeve of claim 39 wherein said polyurethane elastomer possesses an M100 of at least about 900 psi.

41. The coupling sleeve of claim 39 wherein said polyurethane elastomer possesses an M100 in the range of from about 1000 to about 2000 psi.

42. The coupling sleeve of claim 4 wherein the polyisocyanate prepolymer is characterized by a level of free isocyanate, and the level of free isocyanate in the prepolymer is less than about 1% by weight of the prepolymer.

43. The coupling sleeve of claim 4 wherein the polyisocyanate prepolymer is characterized by a level of free isocyanate, and the level of free isocyanate in the prepolymer is less than about 0.5% by weight of the prepolymer.

44. A coupling sleeve for use in a sleeve-type flexible shaft coupling device with two substantially coaxial end pieces, comprising a generally annular body having an inner periphery and an outer periphery; said body comprising a central cylindrical portion and two opposing sleeve end portions of generally cylindrical shape defining respective coupling receiving portions which coaxially mate in driving relation with said two end pieces of the coupling device circumferentially around the inner periphery of the sleeve; said coupling receiving portions each comprising a plurality of circumferentially spaced axially extending teeth arranged along at least a portion of said inner periphery, and characterized in that at least one of said central cylindrical portion and said coupling receiving portions comprises a polyurethane elastomer composition comprising the reaction product of,
  (a) a polyisocyanate prepolymer composition being prepared by reacting,
    (i) a diisocyanate selected from;
      (A) PPDI, and
      (B) aliphatic diisocyanates with trans or trans, trans geometric structure,
      with;
    (ii) a polyol selected from;
      (A) polycarbonate polyol,
      (B) polycaprolactone polyol, and
      (C) a mixture of any two or more of said polycarbonate polyols and said polycaprolactone polyols,
    wherein the polyisocyanate prepolymer is characterized by a level of free diisocyanate, and the level of free diisocyanate in the prepolymer is less than about 1% by weight of the prepolymer and;
  (b) a symmetric primary diamine chain extender selected from;
    (i) MCDEA, and
    (ii) TMAB,
    (iii) a mixture of any one or more said symmetric primary diamine chain extenders and any one or more said polyols;
wherein said polyurethane elastomer composition possesses an isocyanate to amine equivalent ratio in the range of from about 0.90:1 to about 1.40:1, and an isocyanate group content of said polyisocyanate prepolymer of from about 3% to about 6% by weight; and
wherein said coupling sleeve has a ratio of outside diameter to shell thickness of from about 8 to about 11.

45. The coupling sleeve of claim 1 wherein the coupling receiving portions comprise a series of axially extending teeth along the full inner periphery of the sleeve which substantially rigidly engage the full outer periphery of the end pieces.

46. The coupling sleeve of claim 4 wherein the coupling receiving portions comprise a series of axially extending teeth along the full inner periphery of the sleeve which substantially rigidly engage the full outer periphery of the end pieces.

47. The coupling sleeve of claim 39 wherein the annular body is substantially rigid and the coupling receiving portions comprise a series of axially extending teeth along the full inner periphery of the sleeve which engage the end pieces.

48. The coupling sleeve of claim 44 wherein the coupling receiving portions comprise a series of axially extending teeth along the full inner periphery of the sleeve for rigid engagement of the end pieces with the coupling receiving portions along the full inner periphery of the sleeve.

49. The coupling sleeve of claim 1 wherein the outer periphery of the annular body portion is free of a reinforcing member placed radially outwardly and in close proximity thereto.

50. The coupling sleeve of claim 30 wherein the outer periphery of the annular body portion is free of a reinforcing member placed radially outwardly and in close proximity thereto.

51. The coupling sleeve of claim 1 wherein the respective coupling receiving portions extend respectively from each opposing sleeve end portion axially inwardly along the inner periphery of the sleeve to the central cylindrical portion of the sleeve body.

52. The coupling sleeve of claim 4 wherein the respective coupling receiving portions extend respectively from each opposing sleeve end portion axially inwardly along the inner periphery of the sleeve to the central cylindrical portion of the sleeve body.

53. The coupling sleeve of claim 39 wherein the respective coupling receiving portions extend respectively from each opposing sleeve end portion axially inwardly along the inner periphery of the sleeve to the central cylindrical portion of the sleeve body.

54. The coupling sleeve of claim 44 wherein the respective coupling receiving portions extend respectively from each opposing sleeve end portion axially inwardly along the inner periphery of the sleeve to the central cylindrical portion of the sleeve body.

55. The coupling sleeve of claim 51 wherein said teeth mechanically interlock with said grooves.

56. The coupling sleeve of claim 52 wherein said teeth mechanically interlock with said grooves.

57. The coupling sleeve of claim 53 wherein said teeth mechanically interlock with said grooves.

58. The coupling sleeve of claim 54 wherein said teeth mechanically interlock with said grooves.

59. The coupling sleeve of claim 4 constructed in the absence of fiber loading, tensile member and fabric jacket and having said composition as its primary constituent.

* * * * *